United States Patent [19]

Peterman

[11] Patent Number: 4,616,888
[45] Date of Patent: Oct. 14, 1986

[54] SAFETY BRAKE FOR MOBILE STORAGE APPARATUS

[75] Inventor: Robert J. Peterman, Hartland, Wis.

[73] Assignee: Spacesaver Corporation, Fort Atkinson, Wis.

[21] Appl. No.: 649,692

[22] Filed: Sep. 12, 1984

[51] Int. Cl.[4] .............................................. A47B 53/02
[52] U.S. Cl. ................................... 312/201; 188/71.2; 188/167; 192/143
[58] Field of Search ............................... 312/198–201; 188/39, 71.1, 71.2, 83, 166, 167, 69, 31; 192/143, 176, 17 R, 9

[56] References Cited

U.S. PATENT DOCUMENTS

| 1,421,241 | 6/1922 | Ingham | 188/83 |
| 1,953,996 | 4/1934 | Taylor | 188/167 |
| 3,028,619 | 4/1962 | Schlage et al. | 188/71.1 |
| 3,961,831 | 6/1976 | Showell et al. | 312/200 |
| 4,518,066 | 5/1985 | Barr | 188/31 |

Primary Examiner—William E. Lyddane
Assistant Examiner—Joseph Falk
Attorney, Agent, or Firm—Fuller, House & Hohenfeldt

[57] ABSTRACT

A mobile storage system includes a safety brake for smoothly stopping a moving carriage. The brake is operated from readily assessible positions in the aisles between carriages, thus minimizing the risk of injury to persons in the aisles if another person starts a carriage. The brake includes a notched plate which normally rotates with a carriage axle. Upon actuation of a safety switch, a toothed lever mounted to the carriage frame engages the plate, thereby preventing it from rotating. Friction discs on either side of the plate dissipate the carriage kinetic energy into heat and thereby stop the carriage. The control circuit includes a timer so that the person may safely leave the aisle before the carriage can again be moved.

4 Claims, 5 Drawing Figures

U.S. Patent     Oct. 14, 1986     4,616,888
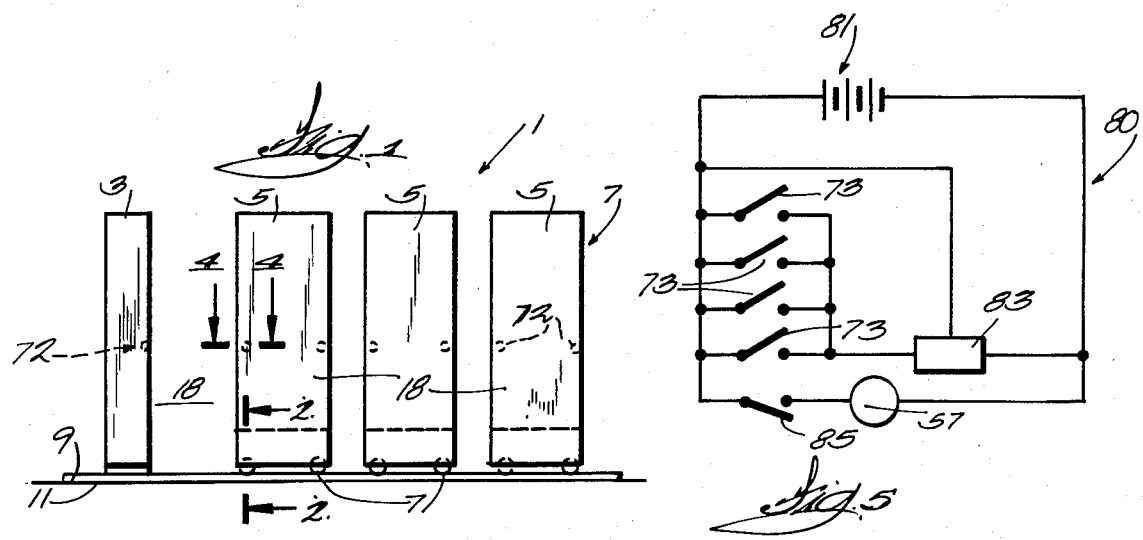
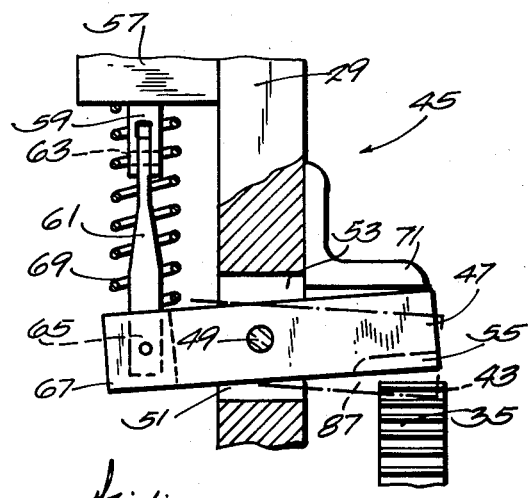
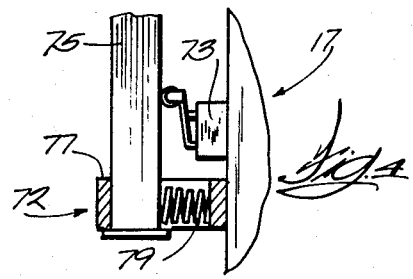
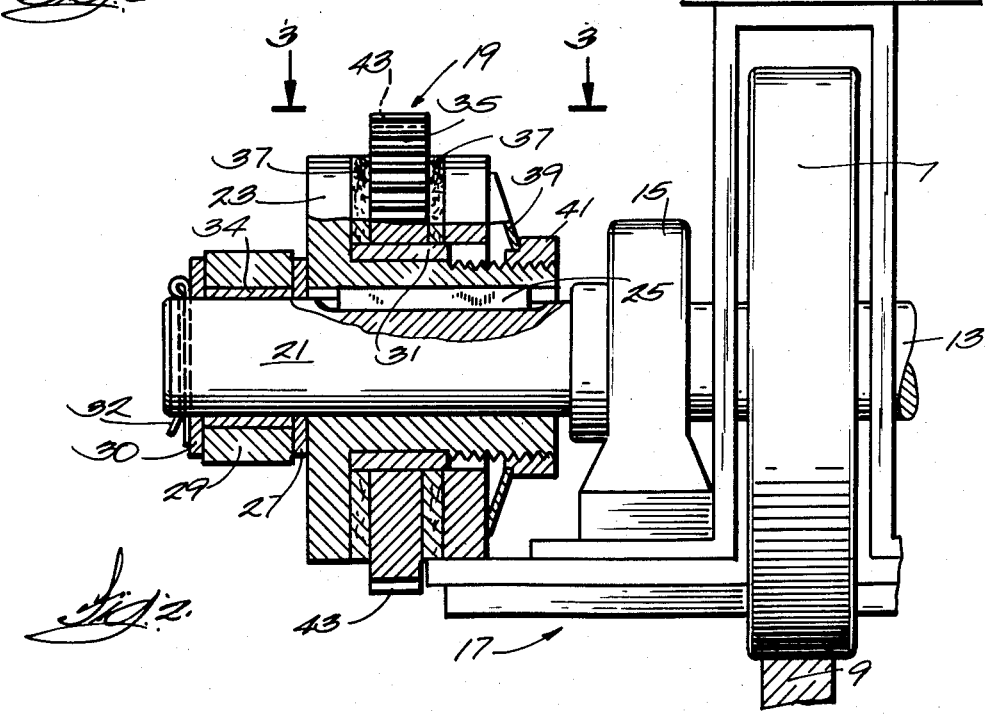

SAFETY BRAKE FOR MOBILE STORAGE APPARATUS

BACKGROUND OF THE INVENTION

1. Field of the Invention.

This invention pertains to safety apparatus, and more particularly to safety devices for stopping a moving storage carriage.

2. Description of the Prior Art.

Mobile storage systems for storing books and related items in libraries and offices are well known. Typically, the system includes several bookcase-like carriages which roll along rails embedded in the building floor. To securely lock a mobile carriage in place and thus prevent accidental start up and possible injury to a person in its path, various locking devices have been developed. For example, U.S. patent application Ser. No. 575,216 illustrates a rack and a spring loaded locking bar. U.S. Pat. No. 4,523,794 discloses a reciprocatable pin type locking device. However, the devices of the two mentioned patent applications are intended for locking a stationary carriage at a selected location along the system rails; they are not designed to stop a moving carriage.

Especially with storage systems which are electrically powered, it is very important that means for quickly stopping a moving carriage be available. For that purpose, it is known to install safety switches at locations easily reached by a person standing in the path of a carriage which is started by another person. Prior switches acted to break the electrical circuit to the drive motors. However, the substantial inertia of a heavily loaded carriage permitted it to coast a relatively great distance, so that a person in its path was still subject to possible injury. Further, prior switching circuits for interrupting the drive motors were of the momentary interrupt type. That is, after de-energization, the drive motors could be immediately re-energized to provide power for moving the carriage. Thus, a de-energized carriage could be restarted before a trapped person left the danger area.

SUMMARY OF THE INVENTION

In accordance with the present invention, safety means is provided which is capable of protecting a person standing in the path of a moving carriage of a mobile storage system. This is accomplished by apparatus which includes a safety brake in combination with an anti-repeat electrical circuit for controlling the safety brake.

The safety brake operates to quickly stop a moving storage carriage. To smoothly decelerate the carriage, the brake is preferably of the energy dissipating type. In the preferred embodiment, the brake includes a pair of spring loaded friction discs for bearing against a plate interposed therebetween. The plate and friction discs normally rotate with one of the axles which support and roll the storage carriage along the system rails. The plate is selectively lockable against rotation, and when locked, the energy of the moving carriage and axles is dissipated as heat between the friction discs and the plate. The plate may be formed with peripheral notches which are engaged by a toothed lever operated by a mechanical motion producing device such as an electrical solenoid. The motion producing device is actuated by safety switches placed at readily assessible locations throughout the mobile storage system.

The safety switches form part of a circuit which controls the motion producing device for operating the safety brake. The control circuit is preferably an electrical circuit, and it includes time delay and anti-repeat features. Upon actuating a safety switch, the brake is immediately applied, and it remains applied for a predetermined time regardless of the condition of the actuated or other switches in the circuit. The time delay permits a person to safely leave the dangerous location before the brake is released. The anti-repeat feature requires that all safety switches be released before the circuit can be again actuated. That feature prevents draining of the power source in case a switch is accidentally held closed for an extended time.

Other objects and advantages of the invention will become apparent to those skilled in the art from the disclosure.

BRIEF DESCRIPTION OF THE DRAWINGS

FIG. 1 is a side view of a typical mobile storage system which advantageously employs the present invention;

FIG. 2 is a partial sectional view taken along lines 2—2 of FIG. 1;

FIG. 3 is a top view, partially in section, taken along line 3—3 of FIG. 2;

FIG. 4 is a partial sectional view taken along lines 4—4 of FIG. 1; and

FIG. 5 is a schematic view of the electrical circuit for controlling the safety brake of the present invention.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIG. 1, a mobile storage system is illustrated which includes the present invention. The mobile storage system finds particular usefulness for storing books and files in libraries and offices, but the invention is not limited to storage system applications.

The mobile storage system 1 typically includes a fixed bookcase-like storage unit 3 and several movable storage carriages 5. To easily move the carriages 5, they are equipped with wheels 7 which ride along two or more parallel rails 9 in a well-known manner. See FIG. 2. The rails 9 are firmly embedded in the floor 11 of the office or library. The wheels 7 are fixed to axles 13, which are mounted for rotation in conventional pillow blocks 15 secured to the carriage frame 17 in a known manner. To move a carriage along the rails, one or more axles thereof are rotatably driven by a conventional mechanical or electrical driving mechanism, not shown. Movement of the carriage creates or eliminates aisles 18 between the carriages, FIG. 1.

In accordance with the present invention, each carriage 5 is provided with a safety mechanism for automatically stopping a moving carriage and thereby preventing injury to a person caught in an aisle 18 adjacent the moving carriage. Automatic stopping is especially important with electrically powered carriages. The safety mechanism may be designed as a mechanical chock positioned between a wheel 7 and a rail 9. Alternatively, the safety mechanism may be a pin adapted and controlled to engage suitable holes within a wheel. However, to smoothly decelerate the heavy carriage to a safe stop, the safety mechanism is preferably an energy dissipating brake. For example, the brake may be a caliper brake mounted to the carriage frame 17 for gripping opposite sides of a rail.

In the preferred embodiment, the safety mechanism includes a friction type safety brake 19, FIG. 2. The safety brake 19 is mounted on an extension 21 of an axle 13. The safety brake includes a carrier 23 keyed to the shaft extension 21 for rotation therewith by a key 25. The carrier is retained on the shaft extension by a thrust washer 27 interposed between the carrier and a horizontal bar 29 mounted to the frame 17 in any suitable manner. The bar 29 may be partially supported by the end of the shaft extension and held axially in place by a thrust washer 30 and cotter pin 32. With that design, a bearing 34 is employed between the bar and shaft extension.

A sleeve 31 is slipped over the hub portion 33 of the carrier 23, and over the sleeve 31 is placed a cylindrical plate 35 with a friction disc 37 on both sides thereof. To apply a variable amount of axial force to the friction discs 37 and plate 35, a Belleville washer 39 is employed with a nut 41 which is threaded onto the carrier hub 33. It will be appreciated that turning the nut 41 on the hub varies the deflection of the Belleville washer 39 and thereby adjusts the axial force on the friction discs and plate. With sufficient axial force, the plate, friction discs, and Belleville washer rotate as a unit with the carrier and nut.

The periphery of the plate 35 is formed with a plurality of notches 43. For the purpose of preventing the plate from rotating with the carrier 23 and axle 13, the present invention includes an operating mechanism for engaging the plate notches 43. The operating mechanism may be a reciprocatable member, such as the piston rod of a fluid powered cylinder adapted to engage the notches 43. In the structure illustrated in FIG. 3, the operating mechanism 45 comprises a lever 47 which pivots about a pin 49 inserted in the carriage bar 29. The lever 47 may pass through a straight sided opening 51 in the bar so that the lever is guided on the bottom and top surfaces by bar bottom wall 53 and a similar top wall, not illustrated in FIG. 3. To engage the notches 43 of the plate 35, one end of the lever is fabricated with a single tooth 55 which is configured to match the plate notches. The lever is pivoted for selectively engaging and disengaging the tooth 55 thereof with the plate notches by a source of mechanical motion, which may be a pneumatic device such as an air cylinder. Preferably, the motion source is an electric solenoid 57 having a plunger 59 pinned to one end of a rod 61 with pin 63. The second end of the rod 61 is pinned with pin 65 to the second end 67 of the lever, which may be made as a clevis for straddling the pin 61. The lever is biased to the disengaged mode relative to the plate by a spring 69. To limit the lever rotation under the influence of the spring 69, a stop 71 may be attached to the bar 29.

The safety brake and operating mechanism of the present invention may be actuated by pneumatic, mechanical, or electrical means. Referring to FIGS. 1 and 4, a preferred actuating mechanism 72 is illustrated for actuating safety brake 19 and operating mechanism 45. The actuating mechanism 72 includes a normally open safety sweep switch 73 in combination with a spring loaded safety bar 75. A safety bar 75 is mounted horizontally at a convenient height along the length of each side of the moving carriages 5 and also on each fixed unit 3. The ends of each safety bar are supported by a notched bracket 77. The safety bars are urged away from the carriage frames 17 by a spring 79 in each bracket 77. FIG. 4 dipicts the normal mode, wherein the safety sweep switch 73 is not actuated by the safety bar.

Turning to FIG. 5, the preferred electrical circuit 80 for operating the present invention will be explained. The circuit includes a source of electrical power, such as a 12 volt battery 81. A conventional timer 83 and the several safety sweep switches 73 are in series within the circuit 80. The several safety sweep switches are in parallel, so that actuation of any one of them will actuate the operating mechanism 45 and safety brake 19. In parallel with the timer 83 and safety sweep switches are the solenoid 57 and the timer contact 85. As shown, the timer contact 85 is normally open.

In operation, it will be assumed that a person standing in an aisle 18 pushes a safety bar 75 when a carriage 5 is moving. The safety bar closes the associated safety sweep switch 73. The timer 83 is energized to close contact 85 and thus actuate solenoid 57. The plunger 59 retracts into the solenoid, thereby pivoting the lever 47 to the brake engaging position indicated by the phantom lines 87 of FIG. 3. The tooth 55 engages a notch 43 in the plate 35, thereby stopping the plate from rotating with the carrier 23, axle 13, and wheels 7. The friction force induced between the stationary plate and friction discs 37 by the Belleville washer 39 dissipates the kinetic energy of the carriage into heat, and the carriage coasts to a smooth and safe stop.

The timer 83 (FIG. 5) is employed to assure adequate time for the person to leave the aisle 18. A 2 second delay before the contact 85 reopens after actuating a switch 73 is considered adequate. At the end of the 12 second delay, the contact 85 opens, and the solenoid de-energizes. The spring 69 (FIG. 3) then pivots the lever 47 to the disengaged position with respect to plate 35.

It is possible that a safety sweep switch 73 may be held closed for an extended time, as, for example, by an object positioned against a safety bar 75. To prevent draining the battery 81 under that circumstances, the circuit 80 includes an anti-repeat feature which requires that all safety sweep switches be returned to the open position before a new actuation can be initiated.

Thus, it is apparent that there has been provided, in accordance with the invention, a safety brake for mobile storage apparatus which fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A brake for smoothly stopping a bidirectional rotating shaft journaled in a frame comprising:
   a. a carrier having a flange and a threaded hub mounted to the shaft for rotation therewith;
   b. a cylindrical plate carried by the carrier hub and having at least one notch on the periphery thereof;
   c. a pair of friction disks carried by the carrier hub, one disk being disposed on either side of the plate;

d. resilient biasing means for axially forcing the friction disks and plate against the carrier flange to cause the plate to rotate with the carrier;

e. a nut threaded onto the carrier threaded hub for producing an adjustable axial force on the friction disks and plate against the carrier flange;

f. lever means for preventing rotation of the plate in both directions;

g. an electric solenoid having a plunger connected to the lever means for operating the lever means in one direction to engage the lever means with the plate notch; and h. spring means for operating the lever means in the opposite direction as the solenoid to disengage the lever means from the plate notch, so that the kenetic energy associated with the rotating shaft is dissipated as heat between the friction disks and the non-rotating plate when the lever tooth is engaged in the plate notch.

2. In combination with a mobile storage system having at least one movable storage carriage having a frame; a plurality of wheels for moving the carriage bidirectionally along rails embedded in a building floor; and a plurality of axles journaled in the frame for supporting the frame on the wheels, the improvement comprising:

a. a control circuit having a source of power;

b. actuating means mounted to at least one moving carriage remote from the axles for actuating the control circuit;

c. brake means mounted to an axle for safely stopping the axle against rotation;

d. lever means pivotally mounted to the carrier frame for selectively engaging the brake means to stop axle rotation;

e. a solenoid within the circuit for pivoting the lever means in a first direction to engage the brake means in response to actuation of the control circuit by the actuating means; and f. spring means for pivoting the lever means in a second direction to disengage the brake means in response to deactuation of the control circuit by the actuating means, so that a person in the path of the moving carriage can stop the carriage by actuating the actuating means and thereby prevent injury.

3. The improved combination of claim 2 wherein the electrical circuit further includes timer means for maintaining the solenoid in the energized mode for a predetermined time after a selective safety switch is actuated, so that the person actuating the safety sweep switch has sufficient time to withdraw from the carriage path before the lever may be disengaged from the plate.

4. The improved combination of claim 3 wherein the electrical circuit further includes antirepeat means for preventing actuation of the solenoid until the safety sweep switch is released to the open condition.

* * * * *